April 26, 1932. M. H. TONCRAY 1,855,429
MOTOR VEHICLE
Filed June 8, 1929
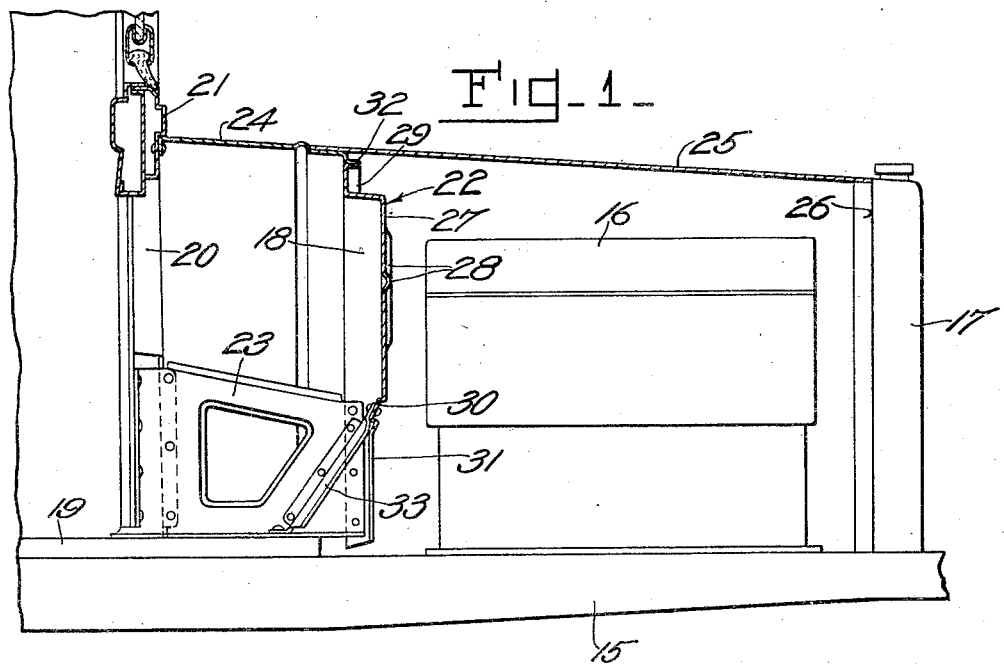
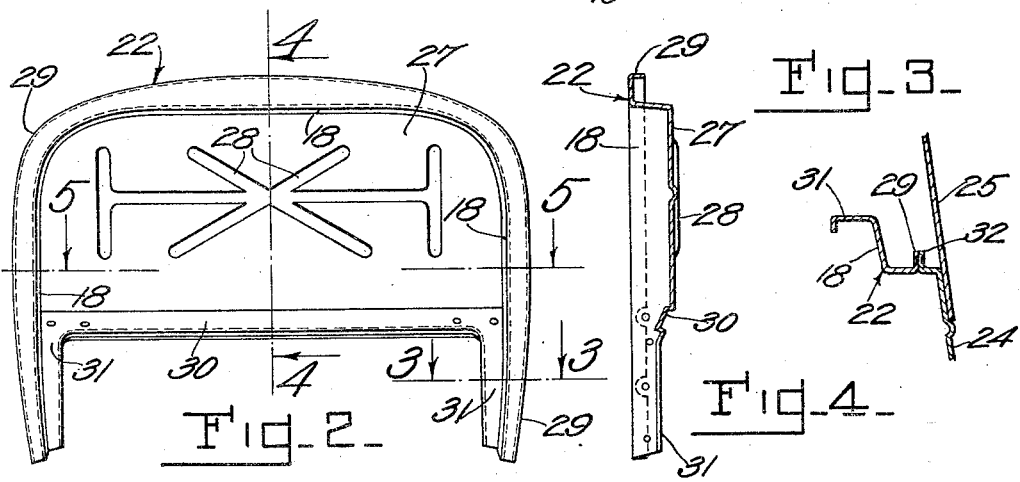
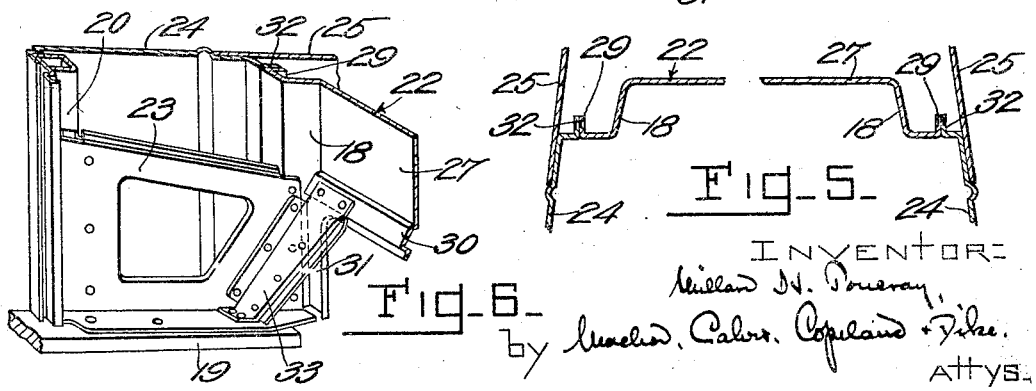

Patented Apr. 26, 1932

1,855,429

UNITED STATES PATENT OFFICE

MILLARD H. TONCRAY, OF DETROIT, MICHIGAN, ASSIGNOR TO HUDSON MOTOR CAR COMPANY, OF DETROIT, MICHIGAN, A CORPORATION OF MICHIGAN

MOTOR VEHICLE

Application filed June 8, 1929. Serial No. 369,439.

This invention relates to motor vehicles and more particularly to those portions thereof which include and are positioned adjacent to the dash or shroud pan, that is to say, the upright transverse member to which the forward edge of the cowl is secured and which separates the interior of the latter from the motor compartment beneath the hood or bonnet.

The production and assembly of the parts of the conventional cowl and dash structure have heretofore involved certain very troublesome difficulties. If, as is usually the case, one of these parts be provided with an inturned flange which is secured, as by welding, riveting or bolting, to the other, the joint must be formed, at least in part, from the interior of the cowl, thereby involving operations which are slow, inconvenient, and correspondingly expensive if properly performed, and which are likely to be slighted unless carefully supervised. If, on the other hand, the dash be formed with an outwardly or forwardly turned marginal flange for attachment to the forward margin of the cowl, so as to permit the formation of the joint at the outside of the latter, the forwardly converging shape of the cowl requires that the flange on the dash be disposed at an angle of less than 90° to the front face thereof. Such a shape cannot be stamped or drawn at a single operation and necessitates cutting or notching of the flange at intervals, resulting in an expensive and flimsy structure. The present invention has, therefore, for its object to provide a cowl and dash assembly comprising a rigid and substantial dash, capable of affording adequate support for the toe board risers and the forward end of the cowl, which can be produced by a single simple drawing operation, and which can be secured to the cowl by operations performed wholly at the exterior of the latter.

The foregoing and other objects of the invention, together with means whereby the latter may be carried into effect, will best be understood from the following description of a preferred embodiment thereof illustrated in the accompanying drawings. It will be understood however that the particular construction described and shown has been chosen for purposes of exemplification merely, and that the invention, as defined by the claims hereunto appended, may be otherwise embodied without departure from the spirit and scope thereof.

In said drawings:

Fig. 1 is a longitudinal vertical section of a portion of the forward end of a motor vehicle embodying the invention;

Fig. 2 is a rear elevation of the dash;

Figs. 3, 4 and 5 are sections taken substantially on the lines 3—3, 4—4 and 5—5, respectively, Fig. 2, Figs. 3 and 5 showing also adjacent portions of the cowl and bonnet.

Fig. 6 is a detail sectional perspective view looking from the interior of the cowl.

In Fig. 1 is shown a part of the forward end of the chassis of a motor vehicle including frame side members 15, a motor 16, and radiator 17.

Mounted on the chassis frame is a body including side sills 19, front pillars 20 connected by a windshield belt panel 21, a vertically and transversely disposed dash 22, brackets 23 secured at their lower edges to the sills 19 and at their front and rear ends to the dash 22 and pillars 20 respectively, and a cowl 24 of the usual forwardly converging form secured at its rear edge in any suitable manner to the pillars 20 and belt panel 21 and at its forward edge, as hereinafter more fully described, to the dash 22. The motor 16 is enclosed by the usual hood or bonnet 25 seated at its forward edge on a ledge or shoulder 26 at the rear of the radiator 17 and at its rear edge, as hereinafter more fully described, on the cowl 24.

In accordance with the present invention, the dash 22 is of dished form comprising a main vertical body portion 27, preferably having embossed thereon stiffening beads or ribs 28, and a rearwardly extending marginal portion joined to the forward edge of the cowl rearwardly of said body portion 27. The marginal portion of the dash, which borders the body portion thereof at the top and sides, is of channel section with the channel opening forwardly of the vehicle, said channel section serving to stiffen the structure to a marked degree. The rearwardly turned inner leg 18 of the channel is disposed at an angle of at least 90° (and preferably greater than 90°) to the adjacent rear face of the body portion 27, while the forwardly turned outer leg 29, which is preferably of less length than the inner leg 18, is disposed at an angle of at least 90° to the front face of the body portion 27, so that the width of the channel is at least as great at its open as at its closed side. It will therefore be seen that the dash can readily be produced in its completed form by a single drawing operation and by the use of relatively simple dies, as will be clear to those skilled in the art. By the same drawing operation there may be formed a downwardly and rearwardly inclined support 30 for the toe board risers 33. The support 30 is integrally connected at its upper edge with the body portion 27, and also at its lateral edges, as indicated at 31 in Figs. 2 and 6, with the channel leg 18, said support being therefore of extremely rigid construction in itself as well as serving further to stiffen the dash as a whole.

The forwardly converging cowl 24 terminates at its forward edge in an inwardly offset marginal portion 32 disposed parallel to the flange or leg 29 of the dash and joined to the latter in any suitable manner, as by spot welding, riveting, or otherwise. This joint, by reason of the dished form of the dash, and the fact that the flange or outer leg 29 is of less length than the inner leg 18 of the channel section, lies substantially rearwardly of the body portion 27 of the dash. Also, by reason of the inwardly offset position of the joint, the rear edge of the bonnet 25 may extend thereover and seat upon the cowl 24 rearwardly of the joint, thereby materially extending the length of the bonnet and, in effect, correspondingly shortening the length of the cowl without disturbing the required position of the main vertical body portion of the dash. It will be observed that the joint between the marginal portion 32 of the cowl and the forwardly turned flange or leg 29 of the dash can be formed wholly at the exterior of the cowl, without requiring any operations at the interior thereof, but that the dash is nevertheless of substantial and rigid construction and can be formed by a single simple drawing operation as above pointed out.

Having thus described my invention, I claim:

1. In a motor vehicle, a cowl, and a dash having a main vertical body portion and a marginal portion of channel section bordering said body portion and integral therewith, said channel opening forwardly and being at least as wide at its open as at its closed side, and the outer leg of said channel being joined to the forward edge of said cowl.

2. In a motor vehicle, a cowl, and a dash having a main vertical body portion and a marginal portion of channel section bordering said body portion and integral therewith, said channel opening forwardly and being at least as wide at its open as at its closed side, and said cowl terminating at its forward edge in an inwardly offset portion joined to the outer leg of said channel.

3. In a motor vehicle, a cowl and a dash having a main vertical body portion and a marginal portion of channel section integral with and bordering said body portion at the top and sides, the outer leg of the channel being joined to the forward edge of said cowl rearwardly of said body portion.

4. In a motor vehicle, a cowl and a dash having a main vertical body portion and a marginal portion integral with and bordering said body portion at the top and sides, said marginal portion being of channel section with the channel opening forwardly, the outer leg of said channel being of less length than the inner leg and being joined to the forward edge of said cowl.

5. In a motor vehicle, a cowl of forwardly converging form and a dash having a main vertical body portion and a forwardly turned marginal flange disposed at an angle of at least 90° to said body portion and integral therewith, said cowl having a marginal portion disposed parallel to said flange and joined thereto.

6. In a motor vehicle, a cowl of forwardly converging form and a dash having a main vertical body portion and a forwardly turned marginal flange disposed at an angle of at least 90° to said body portion and integral therewith, said cowl terminating at its forward edge in an inwardly offset marginal portion disposed parallel to said flange and joined thereto.

7. In a motor vehicle, a dash having a main vertical body portion and a marginal portion of channel section integral with and bordering said body portion, the inner leg of the channel being disposed at an angle of at least 90° to the adjacent face of said body portion, said channel being at least as wide at its open as at its closed side.

8. In a motor vehicle, a dash having a main vertical body portion and a marginal portion of channel section integral with and bordering said body portion, the inner leg of the channel being disposed at an angle of at least 90° to the adjacent face of said body portion, said channel being at least as wide at its open as at its closed side, and a cowl having a marginal portion disposed parallel to the outer leg of said channel and joined thereto.

In testimony whereof I affix my signature.

MILLARD H. TONCRAY.